Feb. 7, 1956 C. C. AVERILL 2,733,884
MATERIAL HANDLING PALLETS OR SKIDS
Filed March 15, 1951 2 Sheets-Sheet 1
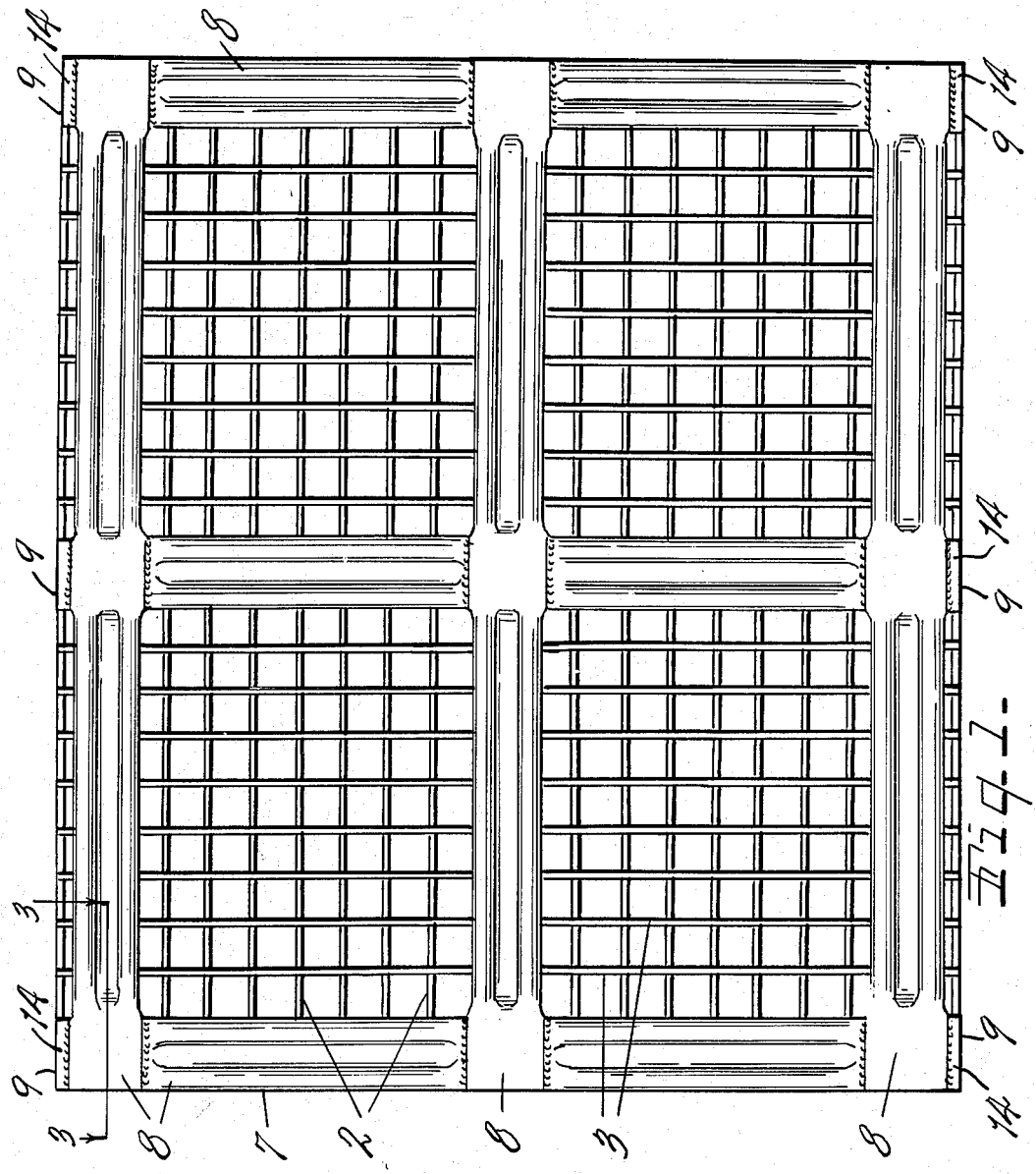
INVENTOR.
Charles C. Averill
BY
Otto A. Earl
Attorney.

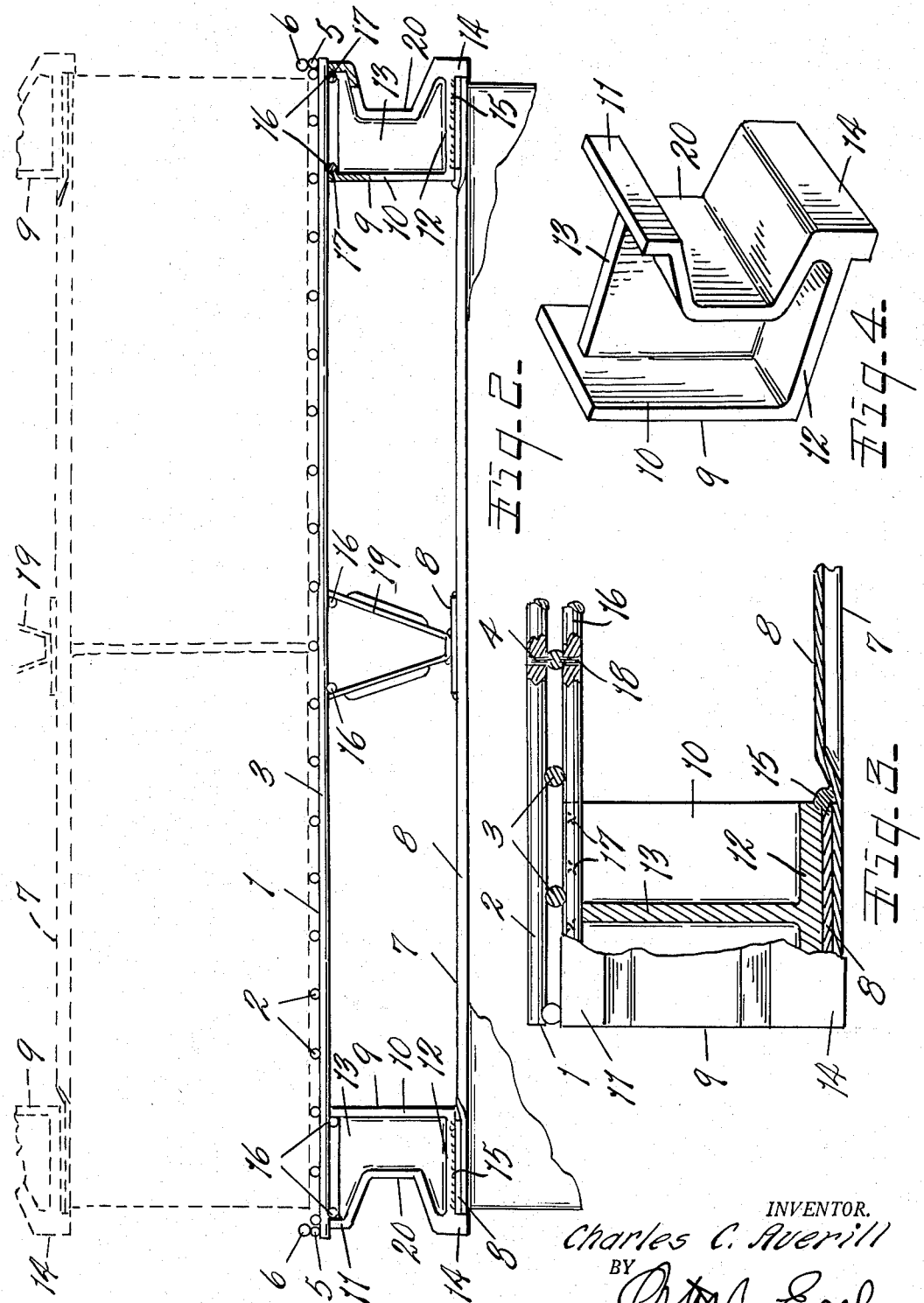

United States Patent Office 2,733,884
Patented Feb. 7, 1956

2,733,884

MATERIAL HANDLING PALLETS OR SKIDS

Charles C. Averill, Albion, Mich., assignor to Union Steel Products Company, Albion, Mich.

Application March 15, 1951, Serial No. 215,667

2 Claims. (Cl. 248—120)

This invention relates to improvements in material handling pallets or skids.

The main objects of this invention are:

First, to provide in a material handling pallet an improved leg structure which is strong and rigid and may be formed as an aluminum casting for the sake of lightness.

Second, to provide a pallet structure in which both the base and legs may be formed of aluminum, thereby permitting the structure to be dragged over concrete or like surfaces without sparking, and at the same time provide a structure which is strong and durable, and one in which the legs protect the base members, as the pallet is dragged or pushed along on a surface.

Third, to provide a pallet structure in which the base is so related to the deck, as to rest upon the load of a pallet on which it is superimposed in such a manner that its weight is most effectively sustained or supported.

Objects relating to details and economies of the invention will appear from the description to follow. The invention is defined and pointed out in the claims.

A preferred embodiment of the invention is illustrated in the accompanying drawing, in which:

Fig. 1 is an inverted view of a pallet embodying my invention.

Fig. 2 is a side elevational view of the pallet with fragments of the cartons on which said pallet is superimposed shown in full lines, cartons being shown on the pallet by dotted lines and a superimposed pallet being indicated by dotted lines.

Fig. 3 is an enlarged fragmentary section corresponding to line 3—3 of Fig. 1.

Fig. 4 is a perspective view of one of the legs. It is common practice to use pallets of the type illustrated for the handling of materials in cartons, that is, the pallet is loaded with filled cartons such as are conventionally illustrated in Fig. 1 of the drawings. These loaded pallets are stacked one upon another and the cartons are frequently crushed and broken, and the contents of the cartons damaged. One of the main objects of this invention is to provide a pallet in which the load of the superimposed pallet is applied to the carton and at or closely adjacent to the vertical walls thereof, thereby better enabling the carton to withstand the crushing stresses.

In the embodiment illustrated I provide a deck designated by the numeral 1 and comprising upper and lower series of spaced parallel wire slats or bars 2 and 3. These bars are connected by spot welding at their crossing points as indicated at 4. In the structure illustrated additional side rails 5 and 6 are provided. The base, designated generally by the numeral 7 is formed of sheet metal bars 8 of substantial width disposed horizontally flatwise. These base bars are arranged in upper and lower sets, the bars of the sets being disposed in spaced parallel relation to each other, the bars of each set crossing the bars of the other set and being welded at their crossing points. The legs 9 are formed as integral castings and comprise inner and outer leg members 10 and 11 and an integral base 12, the leg members and base being connected by the integral web 13. The leg is provided with a depending nose portion 14 at its outer end, this nose portion lapping over the outer edges of the bars, bars upon which the legs are positioned. The legs are fixedly secured to the base by means of welds 15. The legs extend above the web 13 and are welded to the leg attaching bars 16, the welds being conventionally indicated at 17. The upper edge of the web is in supported engagement with the leg attaching bars 16, the attaching bars are welded to lower deck bars 3 as indicated at 18. This provides a very rigid construction and permits the legs being made as castings. However one of the objects is to provide a structure in which the legs may be made of aluminum and the base may also be formed of aluminum bars or strips and effectively secured by the legs. The nose portions of the legs protects the bars when the pallet is dragged across a surface such as a cement dock or floor. When these parts are of aluminum or non-ferrous metal, sparking is prevented, which is advantageous in handling various materials, such for example as ammunition, or in other conditions where sparks might result in fire.

The outer edges of the bases are in substantially the vertical plane of the load receiving portion of the deck, so that when one pallet is stacked on another loaded pallet, for example the pallet loaded with cartons in Fig. 1 of the drawings, the base is positioned so that the load is applied to cartons at points of most effective resistance or load sustaining capacity.

In the embodiment illustrated the central legs 19 are of V shape. Their bights being secured to the central base bars and their leg members secured to the attaching bars 16.

It will be appreciated that the cartons are shown conventionally in the accompanying drawing, and they may in practice be of various dimensions, but are arranged so that the load is largely carried by the vertical walls thereof. Leg members 11, preferably have insets 20 therein which adapts the pallets to receive grappling bars disposed below the deck, when it is desired to handle the pallet by slings.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described my invention, what I claim as new and desire to secure by Letters Patent is:

1. A leg for a material handling pallet formed as an integral casting and comprising a flat bottomed base member having a relatively thick nose portion at its front end projecting upwardly and downwardly therefrom and providing an inwardly facing shoulder therefor, inner and outer laterally spaced leg members, said base and leg members being of substantial width, the inner leg member being substantially flat, the outer leg member merging into said nose portion and having an inward offset above said nose portion, and a centrally disposed web integrally connecting said base and leg members, the upper edge of the web constituting a seat for a superimposed load carrying element.

2. A leg for a material handling pallet formed as an integral casting and comprising a base member, inner and outer laterally spaced leg members of substantial width, the outer leg member having an outwardly facing hanger receiving recess below its upper end, and a web integrally connecting the base and leg members, the upper end of the web constituting a load supporting seat, the lower end of the front leg member and the front end of the base member merging into a relatively thickened nose portion, the lower edge of which projects below the base member and constitutes a guard for a base element secured to the underside of the base member.

References Cited in the file of this patent

UNITED STATES PATENTS

| | | |
|---|---|---|
| 1,830,998 | Harbord | Nov. 10, 1931 |
| 2,465,134 | Toffolon | Mar. 22, 1949 |
| 2,475,370 | Bitney | July 5, 1949 |
| 2,487,687 | Arthur et al. | Nov. 8, 1949 |
| 2,546,830 | McKim | Mar. 27, 1951 |
| 2,590,941 | Coit | Apr. 1, 1952 |
| 2,700,522 | Averill et al. | Jan. 25, 1955 |